United States Patent [19]

Straub

[11] Patent Number: 5,564,625

[45] Date of Patent: Oct. 15, 1996

[54] METHOD FOR CONTROLLING MOTOR VEHICLE INTERIOR TEMPERATURE

[75] Inventor: Wolfgang Straub, Deggingen, Germany

[73] Assignee: Mercedes-Benz AG, Germany

[21] Appl. No.: 306,117

[22] Filed: Sep. 14, 1994

[30] Foreign Application Priority Data

Sep. 14, 1993 [DE] Germany .......................... 43 31 142.3

[51] Int. Cl.$^6$ .............................. F28F 27/00; G05B 11/36
[52] U.S. Cl. ........................... 236/37; 236/78 D; 318/609; 364/137
[58] Field of Search ................................... 236/78 D, 37; 364/137; 318/609; 62/211

[56] References Cited

U.S. PATENT DOCUMENTS

| | | | |
|---|---|---|---|
| 4,494,184 | 1/1985 | Crevel | 364/505 X |
| 4,757,944 | 4/1987 | Kagohata et al. | 236/91 F |

FOREIGN PATENT DOCUMENTS

| | | |
|---|---|---|
| 3121031 | 12/1982 | Germany . |
| 3425445 | 2/1985 | Germany . |
| 3610962 | 6/1990 | Germany . |
| 4123882 | 1/1993 | Germany . |
| 0033603 | 2/1985 | Japan ................................... 236/78 D |

OTHER PUBLICATIONS

Instrumentation For Process Control; Anderson, pp. 158, 159, TA 165,A75 1972.

Primary Examiner—William E. Wayner
Attorney, Agent, or Firm—Evenson, McKeown, Edwards & Lenahan, P.L.L.C.

[57] ABSTRACT

A method for controlling the temperature of an interior, particularly for a motor vehicle immediately sets the desired temperature of the inflowing medium by way of PI control in a starting phase only if the initial interior-temperature error values are small. With larger initial control imbalances, an offset desired temperature for the medium acting thermally on the interior is first of all set such that the interior-temperature error is counteracted to the maximum extent by the inner control loop. The range of small interior-temperature errors is thus regained as rapidly as possible, after which PI control is carried out.

8 Claims, 2 Drawing Sheets

METHOD FOR CONTROLLING MOTOR VEHICLE INTERIOR TEMPERATURE

BACKGROUND AND SUMMARY OF THE INVENTION

The present invention relates to a method for controlling the temperature of an interior, particularly for a motor vehicle, and more particularly, to a method for controlling an interior-temperature with an inner control loop to control the temperature of a medium acting thermally on the interior, and the desired medium temperature is specified as a reference variable for the inner control loop by an outer control loop as a function of an interior-temperature error.

A temperature control method is described in DE 41 23 882 A1 in the form of a heating control system for a motor vehicle interior. Air which is fed to a heat exchanger from outside and then from the heat exchanger is blown into the vehicle interior simultaneously forms the medium in the interior and the medium exerting a thermal action on the interior. An inner control loop adjusts the temperature of the air blown in accordance with a specified desired blow-in air temperature. This desired blow-in air temperature, for its part, is obtained as the manipulated variable of an outer control loop, the reference variable of which is given by the desired interior temperature set by the user. In the case of small interior-temperature deviations, the manipulated variable of the outer control loop is normally determined by means of a PI control facility, the I-component advantageously ensuring the achievement of an infinitesimal deviation. In the case of large deviations, e.g. due to receding disturbances, such as, for example, a falling outside temperature following previous strong irradiation by the sun, however, the PI control facility does not respond as rapidly as desired. The known method therefore envisages to switch over control to purely P control at a specified limiting value in the event of an excessively large deviation of the outer control loop in at least one direction.

For controlling the interior temperature, particularly of a motor vehicle, it is known from DE 36 10 962 C2 that the temperature of the inflowing air can be recorded by an appropriate temperature sensor and weighted as a function of the deviation of the interior temperature.

For temperature control by a mixing-valve thermostat, DE 34 25 445 A1 describes an inner control loop acting as a regulating unit on the mixing valve and an outer control loop arranged on the input side and having a temperature controller. It is possible for the temperature controller to be a PI controller and, with its manipulated variable signal, to produce the reference variable signal for the inner control loop.

Offenlegungsschrift DE 31 21 031 A1 discloses a device for controlling the temperature of a heating boiler which comprises a PI controller and a comparator connected in parallel with the latter. As long as the actual temperature in a heating-up phase remains below a specifiable limiting value which, in turn, is somewhat lower than the specified desired temperature value, the comparator emits an output signal which, on the one hand, keeps the PI controller switched off and, on the other hand, acts as a control signal for heating up. As soon as the actual temperature exceeds the limiting value, the comparator switches over and the PI controller assumes control of the temperature.

An object of the present invention is to provide a temperature controlling method in which errors occurring as control continues can be reliably eliminated and initial relatively large deviations from the control equilibrium can be reduced as rapidly as possible in a starting phase.

This object has been achieved in accordance with the present invention by a method in which (a) at least one limiting value for starting operation is specified, for a temperature parameter representative of the initial control system state, and at least one switchover limiting value for the interior-temperature error, (b) at the beginning of each activation of the control system, an actual value of a temperature parameter representative of an initial control system state is compared with a specified limiting value to obtain an error and, if the limiting value has been exceeded, an offset desired temperature of the medium by the outer control loop is determined such that a value of the manipulated variable with a maximum counteractive action is set by the inner control loop until the interior-temperature error assumes a lower-magnitude value than the specified switch-over limiting value for the error, and thereafter continuing control by determination of the desired temperature via PI control, and, if the limiting value has not been exceeded, and (c) control is immediately carried out by determination of the desired temperature of the medium by a PI control facility.

At least one limit value is specified for starting operation for a temperature parameter representative of the initial control system state, such as, for example, the initial interior-temperature error or the cooling-water temperature of a motor-vehicle heating or air-conditioning system. That specification is used to determine the small amount by which this starting state is allowed to differ from the desired control equilibrium, i.e. from the state when the control system has run in, while still allowing control to be started immediately by the PI control facility.

If, however, the starting state of the control is further away from the control equilibrium then specified by this specified limiting value, control is initially carried out with a maximum counteractive action, in particular by the generation of an appropriate offset desired temperature of the medium by the outer control loop. This offset value acts on the inner control loop such that the latter sets an associated upper value for the manipulating range and hence effects maximum counteractive control. Irrespective of how far the initial temperature-parameter actual value specific to the starting state is from the specified limiting value on the side away from the control equilibrium, the initial control equilibrium is in this way immediately counteracted to the maximum degree until the interior-temperature error exceeds a switchover limiting value, specified for this very purpose, towards small deviations, after which control continues in the PI control mode; and The method of the present invention thus combines PI control, which is advantageous in control operation after running in, and a starting mode, dependent on the starting state of the control system, in a starting phase. In the case of relatively small initial deviations from the control equilibrium, the starting phase comprises immediate PI control but, in the case of relatively large initial deviations, comprises a preceding control mode with a maximum counteractive action. Thereby, the control equilibrium can be achieved more rapidly than where PI control is used immediately. In particular, it is possible with the method of the present invention to counteract large deviations even more rapidly than is possible with P control.

The method of the present invention furthermore ensures that, by appropriate adjustment of the temperature of the inflowing medium, the interior temperature is always adjusted to the desired interior temperature set irrespective of the respective temperature of the exterior space from which, for example in the case of a vehicle air-conditioning system, the medium for the interior is taken. For this purpose the medium is, if required, cooled and/or heated before flowing in. The use of PI control in the case of small deviations makes it possible to achieve the desired interior temperature accurately without it being absolutely necessary to employ an outside temperature sensor for this purpose.

According to a further aspect of the present invention, the manipulated variable of the outer control loop is fed to the inner control loop with a time delay as a reference variable. Thereby, it is possible to adapt control in a suitable manner to the temperature change behavior with time of the system to be controlled, for example a vehicle interior. Undesirably severe fluctuations in the temperature of the inflowing medium are thus prevented.

Another advantageous feature of the present invention provides that the outer control loop determines the offset desired temperature from the sum of the actual temperature value of the medium and a preselectable time-independent additional temperature value. The latter thus corresponds, apart from any slight modification due to the time-delayed transmission of the signal between the outer and the inner control loop, to the error for the inner control loop and is therefore preselected so that it leads there to the generation of an upper value for the manipulated-variable range that counteracts the deviation to the maximum extent.

In yet another advantageous aspect of the present invention, a starting value for a PI control operation following a starting phase with maximum counteractive control after the corresponding switchover limiting value has been exceeded is specified. In that control operation, the desired temperature value of the medium is calculated continuously by a recursive method from the previous desired value and interior-temperature deviations determined in the preceding steps. The starting value is formed as the sum of the actual temperature value of the medium and a preselectable additional temperature value. This feature makes it possible to specify the preselectable additional value suitably depending on the system so that control with the maximum effect of the manipulated variable merges as continuously as possible into Pi control after the limiting value is exceeded and, in particular, the additional value is preselectable as a function of the outside temperature. As a result, whatever the outside temperature, only an insignificant transient control response occurs in each case.

A still further advantageous feature of the present invention is that, after initial maximum counteractive control by the full heating or cooling capacity available, the PI control facility is in each case activated once the interior-temperature error is sufficiently small in magnitude.

The interior-temperature error is, according to the present invention, used as the temperature parameter representative of the initial control system state. The specified limiting values for starting operation are chosen such that the lower limiting value for starting operation is smaller than each switchover limiting value and the upper limiting value for starting operation is larger than each switchover limiting value.

In an alternative embodiment of the present invention, the cooling-water temperature of a vehicle heating or air-conditioning system is used as the temperature parameter representative of the initial control system state. The initial mode with maximum counteractive control is activated if a specified limiting value for the cooling-water temperature as the limiting value for starting operation is undershot.

BRIEF DESCRIPTION OF THE DRAWINGS

These and other objects, features and advantages of the present invention will become more readily apparent from the following detailed description when taken in conjunction with the accompanying drawings wherein.

DETAILED DESCRIPTION OF THE DRAWINGS

Figures 1, 2, 3:
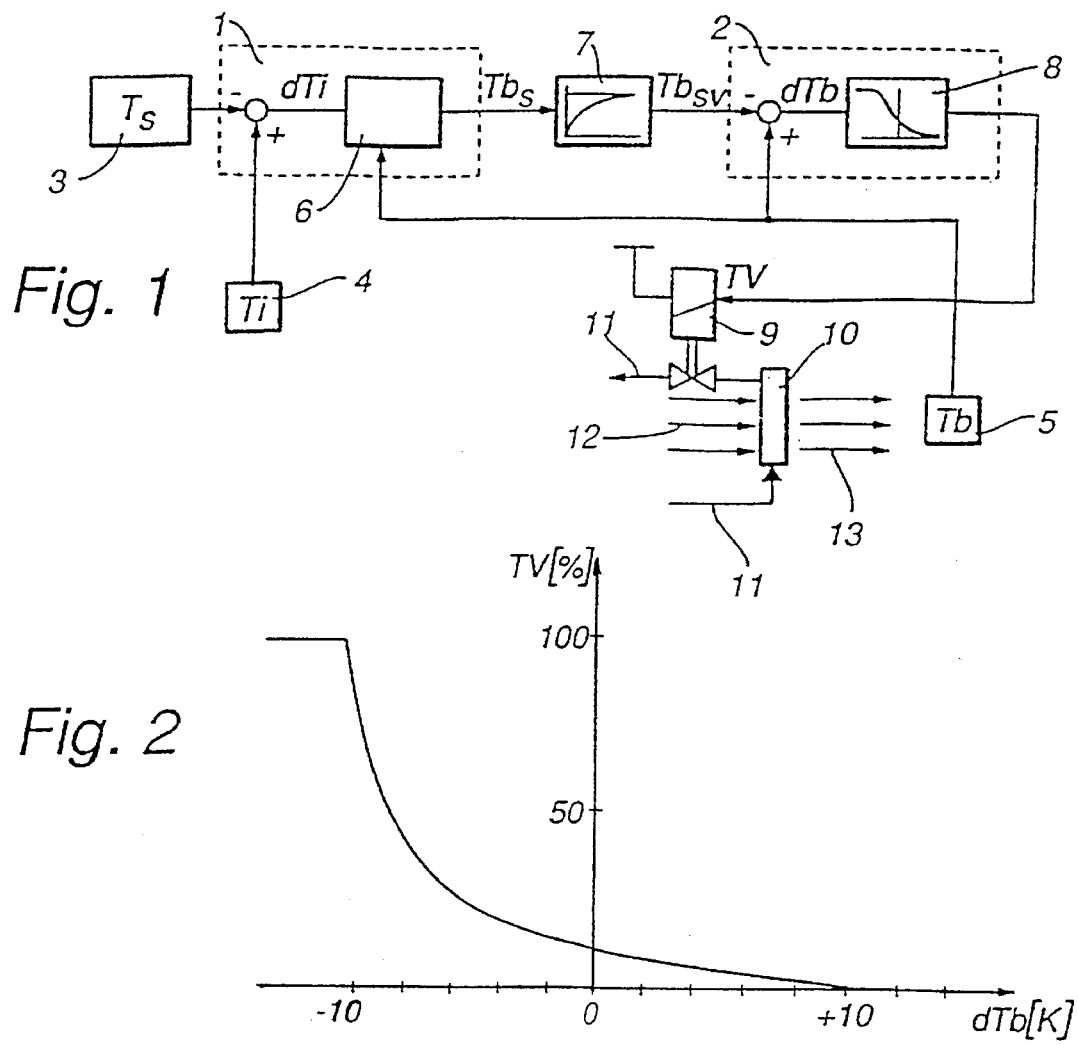
FIG. 1 is a block diagram of an arrangement for controlling the interior temperature of a motor vehicle comprising an inner and an outer control loop in accordance with the present invention.
FIG. 2 is a graph of the manipulated variable/error characteristic of the inner control loop.
FIG. 3 is a graph of the measurement curves for the heating of the motor-vehicle interior carried out by the arrangement of FIG. 1.

The arrangement shown in FIG. 1 controls the temperature of the interior of a motor vehicle and comprises an outer control device 1 as the core of an outer control loop and an inner control device 2 as the core of an inner control loop. Arranged on the input side of the outer control device 1 is a reference variable adjuster 3 at which the required vehicle-interior desired temperature $T_s$ can be set by the user. The feedback variable signal which characterizes the vehicle-interior actual temperature Ti is fed to the outer control device 1 by an interior-temperature sensor 4. From this actual temperature value Ti and the desired temperature value $T_s$, an input-side summing stage of the outer control device 1 determines the error dTi. This error dTi and the output signal of a further temperature sensor 5 are fed to a central controller unit 6 of the outer control device 1.

The further temperature sensor 5 is arranged in the air flow 13 of the air which flows into the vehicle interior from the heat exchanger 10 of an associated heating system at the blow-in air temperature Tb measured by the sensor 5 and represents the medium for controlling the internal temperature. The heat exchanger 10 is heated by a hot-water circuit 11 and, for its part, warms the air 12 flowing in from outside the vehicle to the blow-in air temperature Tb. A flow-controlling pulsed valve 9 is arranged in the water circuit (11) to control this blown-in temperature, thereby allowing the heat transfer from the water circuit 11 to the air flow 12, 13 to be adjusted by a pulsed flow control of the water circuit 11.

From the interior-temperature error dTi and the actual blow-in air temperature Tb, the central controller unit 6 of the outer control device 1 obtains a manipulated-variable signal $Tb_s$ which acts on a first-order time-delay element 7 whose output signal $Tb_{sv}$ is then fed as a reference variable to the inner control device 2. The output signal of the blow-in air temperature sensor 5 is further used as the controlled-variable signal for the inner control device 2. An input-side summing stage of the inner control device 2 forms the error ($dTb=Tb-Tb_{sv}$) from the actual blow-in air temperature Tb and the desired blowin air temperature $Tb_{sv}$ fed in with a time delay by the outer control device 1 on the reference-variable side of the inner control device 2. This error dTb acts, in turn, upon a central controller unit 8 of the inner control device 2, which, as a result of the foregoing, and in conjunction with a system-specifically specified characteristic shown in greater detail in FIG. 2, produces as a manipulated variable a pulsed signal with a certain duty factor TV for the control of the pulsed valve 9.

In the characteristic curve shown in FIG. 2, the duty factor TV in the case of a blow-in air temperature error dTb of less than −10K is 100%. That is, the pulsed valve 9 is completely open, and the heat transfer to the blow-in air is consequently at a maximum when the actual blow-in air temperature Tb is more than 10K below thee desired blowing-air temperature $Tb_{sv}$ specified by the outer control loop. From this point of the characteristic at −10K, the duty factor falls continuously, initially quite steeply and then with a decreasing gradient, as the blow-in air temperature error dTb rises, until it reaches the value zero at an error dTb of +10K. At a 0% duty factor, the pulsed valve 9 is then completely closed, with the result that the water circuit 11 of the heat exchanger 10 is shut off and there is no longer any heat transfer to the blow-in air. The shape of the characteristic should, of course, be set system-specifically and, for example, to match the respective vehicle type under consideration and the heating system employed.

The control method carried out by the arrangement shown in FIG. 1 using the characteristic according to FIG. 2 is explained in greater detail below, with heating being considered first.

Following activation of the heating control system, for example after the ignition of the motor vehicle has been switched on, the behavior of that system is dependent on the measured initial value of the interior-temperature error dTi chosen in this example as a temperature parameter representative of the initial state of the control system, indicating the difference of the actual temperature value minus the desired temperature value. For this purpose, both a lower $dTi_{SGu}$ and an upper limiting value $dTi_{SGo}$ for the interior-temperature error in starting operation are specified, the limiting values in this example being set to $dTi_{SGu}=-8K$ and $dTi_{SGo}=+2K$.

If the initial interior-temperature error dTi lies within the range bounded by these two limiting values $dTi_{SGu}$, $dTi_{SGo}$ for starting operation, this is interpreted by the central controller unit 6 of the outer control device 1 as a slight deviation from control equilibrium and a PI control facility is immediately activated and this continuously iteratively calculates the desired blow-in air temperature $Tb_s$) in accordance with the recursion equation $$Tb_s(k)=Tb_s(k-1)-V\cdot dTi\ (k)-V\cdot(t_o/t_n-1)\cdot dTi\ (k-1)$$

where V denotes a proportional gain, $t_n$ denotes a system-dependent controller time constant, $t_o$ denotes the period of one control cycle, e.g. $t_o=3s$, and k denotes the number of iteration steps. As the initial value $Tb_s(O)$, the initially measured actual blow-in air temperature value (Tb) is chosen and the blow-in air temperature error (dTb) is thus initially set to zero. As can be seen from FIG. 2, with a dTb of zero, control begins with a duty factor TV of about 8% and then slowly approaches the required desired interior-temperature value.

Alternatively, it is also possible to use as the initial value $Tb_s(O)$ a value read-out from a memory of the central controller unit 6 of the outer control device 1, this value having been stored at the end of a preceding control operation. Further control likewise takes place with this PI control, even if, due to severe external disturbances, such as, for example, irradiation by the sun, the internal-temperature error (dTi) briefly enters a range outside the range defined by the above limiting values $dTi_{SGu}$, $dTi_{SGo}$.

If the measured initial interior-temperature error dTi lies below the lower limiting value $dTi_{SGu}=-8K$ for starting operation, i.e. the initial interior temperature Ti is noticeably too small, then the PI control facility is initially not activated by the central controller unit 6 which recognizes this starting condition of the control system as a large deviation from the desired control equilibrium, i.e. from control operation after a running-in period. In a starting phase, the central control unit 6 carries out control with a maximum counteractive action by emitting a desired blow-in air temperature value $Tb_s$ as an offset value of the form $$Tb_{soff}=Tb+X_{SH}$$

and, at the point of control activation, it adds the additional temperature value $X_{SH}$, specified independently of time, to the actual blow-in air temperature value Tb fed to it for this purpose by the corresponding sensor 5. From the above, it follows that in this starting mode, with an initial large negative interior-temperature error dTi, the blow-in air temperature error dTb of the inner control device 2 corresponds fully or, taking into account the time-delayed supply of the desired blow-in air temperature value $Tb_s$ to the inner control device 2, at least approximately to the negative value of this time-independent additional temperature value $X_{SH}$, because of the relation $dTb=Tb-Tb_{sv}$. The additional value $X_{SH}$ can therefore be preselected so as to ensure that at all times the blow-in air temperature error dTb is below −10K. From this it follows that, in this case of the initial undershooting of the lower limiting value $dTi_{SGu}$ for starting operation by the interior-temperature error (dTi), the control system keeps the pulsed valve 9 100%, i.e. completely, open in a starting phase. The flow of water through the heat exchanger 10, and hence the heat transfer to the air 13 to be blown into the interior, are thus initially kept at a maximum to permit the control system to reattain the range of small interior-temperature errors as rapidly as possible.

This starting operation with a maximum counteractive action is maintained until the interior-temperature error dTi exceeds a predetermined lower switchover limiting value $dTi_{Gu}$ for the interior-temperature error. This limiting value is set to $dTi_{GU}=-1K$. Given 100% utilization of the heating capacity, this makes the heating phase very short. Since the PI control facility is deactivated in this phase, this heating phase is not time-discrete and is thus independent of the speed with which the cooling water in the engine heats up and other time constants of the vehicle.

As soon as the interior-temperature error dTi has exceeded the lower switchover limiting value of −1K owing to the maximum supply of heat, the PI controller component of the central controller unit 6 in the outer control device 1 is activated to determine the desired blow-in air value. After this point, the PI controller component continues control as PI control in accordance with the above recursion formula. As a starting value, the PI control facility is assigned an initial desired blow-in air temperature value $Tb_s(O)$ in accordance with the relation $Tb_s(O)=Tb+X_{OH}$. The temperature value $X_{OH}$ now to be added to the actual blow-in air temperature value Tk is here chosen such that upon switching over to PI control, the pulsed control of the valve 9 is initiated with the appropriate duty factor dependent on the prevailing outside temperature. If this temperature is known, e.g. via an appropriate outside temperature sensor, the additional value $X_{OH}$ can be made dependent thereon, with the additional value $X_{OH}$ being greater as the outside temperature is lower.

If the outside temperature is not known, the control system nevertheless remains functional. The additional value $X_{OH}$ is then sized for a particular outside temperature so as to give an optimum transient for this temperature. In the event of outside temperatures which deviate therefrom, slightly different transients do then arise but these are virtually imperceptible to the vehicle occupants. Once PI control has been activated, that control is maintained even if, due to external disturbances, the interior-temperature error dTi falls below the lower switchover limiting value $dTi_{Gu}$ since the PI control facility has no difficulty in correcting such an error in the course of continuing control in contrast to the starting mode, e.g. in the case of a cold engine start.

When the ignition is switched off, the last desired blow-in air temperature value $Tb_s$, from the recursion formula calculated by the PI control facility can be stored in a memory of the central controller unit 6. In the case of a subsequent hot start, in which the PI control facility is activated right from the beginning, this stored value can then be read in again as the initial value in accordance with the alternative discussed above. To decide whether the start is a hot start, the central controller unit 6 of the outer control device 1 tests, as stated, whether the interior-temperature error dTi applied is above the associated specified lower limiting value $dTis_{Gu}$ for starting operation of −8K. The same PI control activation with the stored initial value of the blow-in air temperature can be carried out if, with the ignition switched on, the previously inactive heating system of the vehicle is activated by the user.

Figure 4:
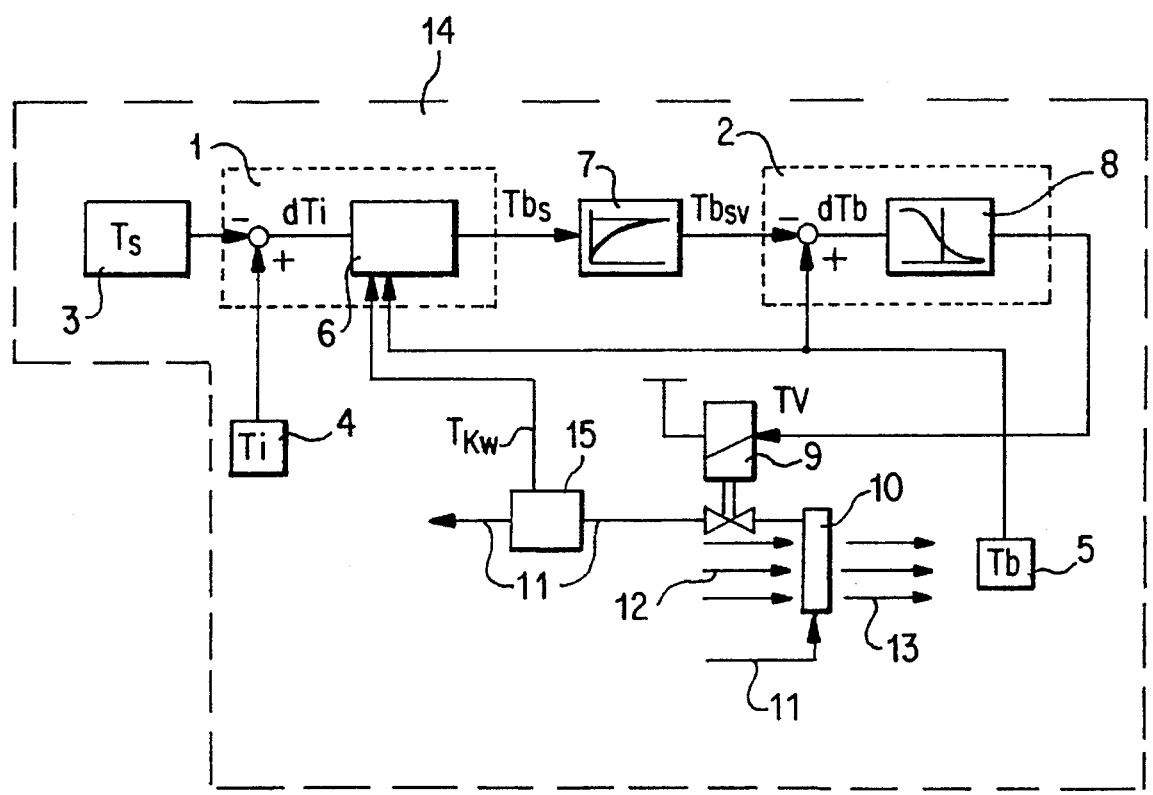
FIG. 4 is a block diagram similar to FIG. 1 but showing an embodiment in which the cooling-water temperature of the cooling water flowing through the heat exchanger is used as a temperature parameter representing the initial control system state.

In an alternative method within the scope of the present invention, the cooling-water temperature of the cooling water flowing through the heat exchanger 10 of the vehicle heating system is used instead of the interior-temperature error as a temperature parameter representative of the initial control system state. In thins embodiment of the invention, the cooling-water temperature $T_{Kw}$ is detected by a conventional sensor 15 (FIG. 4) schematically showing a motor vehicle 14 and to the central controller unit 6 which compares the measured initial cooling-water temperature $T_{Kw}$ with a limiting value $T_{KwG}$ for the cooling-water temperature in starting operation, which is, for example, set to $T_{KwG}=65°$ C. If the initial cooling-water temperature $T_{Kw}$ is higher than this limiting value $T_{KwG}$, this is interpreted as a hot start, where it is possible to eliminate the initial deviation very rapidly by immediate PI control. Accordingly, the PI control facility described above is then activated immediately. However, if the initial cooling-water temperature $T_{Kw}$ is below this limiting value $T_{KwG}$ for starting operation, this is recognized as a cold start, in which the act achievement of the required internal temperature by PI control alone would take an undesirably long time. In this case, therefore, control with the maximum counteractive action is initially carried out by setting the offset desired blow-in air temperature $Tb_{sof}$, as described in detail above. As soon as the lower switchover limiting value $dTi_{Gu}$ of −1K for the interior-temperature error is reached again, the control system switches over to PI control for all further control.

A concrete heating operation for the motor-vehicle interior after a cold start is depicted in FIG. 3. Initially, the blow-in air temperature Tb, the time variation of which is represented by the dot-dash line, lies just above 0° C. and the vehicle-interior temperature Ti represented by the lower solid line just above that. A desired vehicle-interior temperature $T_s$, of +22° C. has been set. The lower limiting value of $dTi_{SGu}=-8K$ for the interior-temperature error in starting operation is thus undershot and, as the manipulated variable $Tb_s$, the outer control device 1 first of all produces the offset value as a value for the blow-in air temperature Tb increased by the additional value $X_{SH}$, with the additional value $X_{SH}$ being set to +20K. The reference variable signal $Tb_{sv}$ for the inner control device 2 produced by the time-delay element 7, which corresponds to the time-delayed manipulated-variable signal of the outer control device 1, is represented in dash lines in FIG. 3. Up to time t1, the blow-in air temperature Tb rises sharply and continuously as the heating-water temperature rises, with the pulsed water-circuit valve 9 continuously fully open, and synchronously with it, though offset by the value $X_{SH}$, the computationally specified desired blow-in air temperature value $Tb_s$.

At time t1, i.e. in the present illustration after about 5 minutes, the interior temperature Ti reaches a value just 1 K lower than the desired interior-temperature value $T_s$ set. Due to the resultant exceeding of the switchover limiting value of $dTi_{Gu}=-1K$ by the interior-temperature error dTi, the central controller unit 6 of the outer control device (1) switches over to PI control, initially, at time t1. The offset value for the desired blow-in air temperature value $Tb_s$ is reduced from the value $Tb+X_{SH}$ to the value $Tb+X_{OH}$ as the starting value for the PI control. The additional value $X_{OH}$ here is +5K. This has the effect of a subsequent continuous fall in the time-delayed desired blow-in air temperature value $Tb_{sv}$ and hence in the reference variable for the inner control device 2. The further alteration of the desired blow-in air temperature value $Tb_s$ in the central controller unit 6 of the outer control device 1 takes place via the above-described recursion formula and, in the further course of its change with time, likewise falls continuously to the final value leading to the interior-temperature error of zero. The measurement curve for the actual vehicle-interior temperature Ti shows how the actual temperature rises rapidly in the starting phase up to time t1 due to the maintenance of maximum heating capacity and is then held at the specified desired value $T_s$ with only slight errors dTi by the PI control, which starts at time t1.

The control arrangement according to FIG. 1 can also be used to carry out the temperature control method to cool the vehicle interior as described below by an air-conditioning system present in the vehicle. For this purpose, in the case of a requirement for low desired blow-in air temperatures, the air coming from outside is first cooled to the maximum extent by the cooling set of the air-conditioning system. This cooled air is then fed as the inlet-side air stream 12 to the heat exchanger 10, after which the control arrangement according to FIG. 1 sets the required blowing-air temperature Tb by appropriate heating. Control is then exercised very largely in a manner similar to that in the case of heating, in the following described manner.

If the initial interior-temperature error dTi is greater than a preselected upper limiting value $dTi_{SGo}$ of $dTi_{SGo}=+2K$ for the interior-temperature error in starting operation, this is recognized as a large deviation by the central controller unit 6 of the outer control device 1 i.e. as a cold start, and, in the starting phase, the desired blow-in air temperature is set as an offset value of the form $Tb_s=Tb-X_{SK}$. In this case again a negative, additional value $-X_{SK}$ is added to the actual blow-in air temperature Tb. The magnitude of the additional temperature value $X_{SK}$ is chosen so that the blow-in air error $dTb=Tb-Tb_{sv}$ for the inner control device 2 remains with certainty greater than +10K despite the time-delay element 7. From the characteristic curve of FIG. 2, it then follows that the pulsed valve 9 remains completely closed and, as a consequence, the air stream 12 cooled to the maximum extent forms the blow-in air stream 13 without being heated in the heat exchanger 10. In the case of an initial interior temperature which is markedly too high, i.e. in the case of an error $dTi=Ti-T_s$ greater than +2K, the maximum cooling capacity of the air-conditioning system is in this way used to cool the vehicle interior as rapidly as possible.

As soon as the maximum cooling capacity supplied brings the interior-temperature error dTi down to below the preselected upper switchover limiting value $dTi_{Go}$ indicated above of $dTi_{Go}=+1K$, this is recognized as the attainment of the range of small positive errors and the PI control facility is activated within the central controller unit 6 of the outer control device 1 and control is then continued with the PI control facility. At the switchover time, the starting value $Tb_s(O)$ for the desired blow-in air temperature specified for PI control is again a starting value in the form $Tb-X_{OK}$. The negative, additional temperature value $-X_{OK}$ added to the actual blow-in air temperature Tb is specified so that the valve 9 is pulsed at a suitable duty factor and the transient which occurs due to switching over the control decays as rapidly as possible. It is again sufficient to match the additional value $X_{OK}$ to a particular outside temperature. Given the availability of information on the outside temperature, this can, of course, be used to set the additional value $X_{OK}$.

The case of an initial interior-temperature error dTi of less than $dTi_{SGo}=+2K$ has already been dealt with above. It is of course, again possible, as an alternative approach to the initial interior-temperature error dTi, to use the initial cooling-water temperature to decide on a hot start with immediate PI control or a cold start with prior maximum counteractive control.

As is evident from the foregoing, the control method described for the control arrangement connected to a vehicle air-conditioning system allows both as rapid as possible heating or cooling of the vehicle interior, in each case after a preselectable limiting value for the initial deviation of the interior temperature from its desired value set by the user or for the initial cooling-water temperature has been exceeded. Due to the special, computationally determined specification of the desired blow-in air temperature during such maximum counteractive control in the case of large initial deviations, by which control this desired value is adjusted continuously in parallel with the actual blow-in air temperature, this desired blow-in air temperature value is already at the correct value matched to the outside temperature when the range of small-magnitude interior-temperature errors is reached and hence when the PI control facility is activated. To compensate for the large initial errors, the heating and/or cooling capacity available in the system is in each case used to the full for counteractive control. Owing to the subsequent activation of the PI control facility, an outside-temperature sensor is not absolutely necessary; the desired interior-temperature value set can be reliably established even without a knowledge of the outside temperature.

The control algorithm and hence its programming into a control unit, which is preferably contained in the central controller unit 6 of the outer control device. 1, remains sufficiently simple and thus, advantageously, only a small amount of memory is required. The central controller unit 6 can, of course, control or regulate other functions in the vehicle or be part of a multi-functional control and regulating device in the vehicle.

The control method can be adapted very simply to the various applications. In particular, by appropriate selection of the starting and switchover limiting values and of the additional temperature values $X_{SH}$, $X_{OH}$, $X_{SK}$ and $X_{OK}$, the control arrangement according to FIG. 1 can be used rapidly and without problems for vehicles of different types. In addition, it is of course possible to choose a plurality of temperature parameters to characterize the initial control system state and to carry out initial operation with maximum counteractive control when one or all of the relevant limiting values are exceeded.

Although the above description relates specifically to a single-duct temperature control system; the control method can also be used without problems for conventional two-duct vehicle air-conditioning systems, i.e. with separate ducts on the right and on the left. The parameter values to be specified can be specified either separately for the left and right ducts or as mean values for both ducts jointly.

Additionally, it is possible without difficulty to carry out the control method by a control arrangement modified relative to that in FIG. 1 and to use it, for example, for controlling the temperature of interior spaces in buildings. In that case, the medium by which control is carried out can then be, for example, the water of a central heating system.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A method for controlling an interior temperature with a control system having an inner control loop to control the temperature of a medium acting thermally on the interior, and the desired medium temperature is specified as a reference variable for the inner control loop by an outer control loop as a function of an interior-temperature error, comprising the steps of (a) specifying at least one limiting value for starting operation, for a temperature parameter representative of the initial control system state, and at least one switchover limiting value for the interior-temperature error, (b) comparing, at the beginning of each activation of the control system, an actual value of a temperature parameter representative of an initial control system state is compared with a specified limiting value to obtain an error and, if the limiting value has been exceeded, determining an offset desired temperature of the medium by the outer control loop such that a value of the manipulated variable with a maximum counteractive action is set by the inner control loop until the interior-temperature error assumes a lower-magnitude value than the specified switch-over limiting value for the error, and thereafter continuing control by determination of the desired temperature of the medium via PI control, and, if the limiting value has not been exceeded, and (c) immediately carrying out control by determination of the desired temperature of the medium by a PI control.

2. The method according to claim 1, further comprising the step of (d) feeding the desired temperature of the medium as the manipulated variable of the outer control loop with a time delay as a reference variable to the inner control loop via a time-delay element.

3. The method according to claim 1, wherein the outer control loop forms the sum of the actual temperature of the medium and a preselectable, time-independent additional value as the offset desired temperature.

4. The method according to claim 1, wherein determination of the desired temperature of the medium continuously by iteration is carried out with a PI control facility, and the sum of the actual temperature of the medium and a preselectable additional value are specified as the desired-temperature starting value.

5. The method to claim 4, wherein the preselectable additional value for the determination of the desired-temperature starting value is preselected as a function of the actual temperature of an external space from which the medium is taken.

6. The method according to claim 1, wherein a negative lower switchover limiting value for the interior-temperature error and a positive upper switchover limiting value for the interior-temperature error are specified, and after an initial control operation with a maximum counteractive action, the system switches over to PI control as soon as the interior-temperature error reaches a value in the range between the lower and upper switchover limiting values.

7. The method according to claim 6, wherein the initial interior-temperature error is chosen as the temperature parameter representative of the initial control system state, and a lower limiting value and an upper limiting value therefor in starting operation are specified, whereby control operation with the maximum counteractive action preceding the subsequent PI control is carried out when the interior-temperature error undershoots the lower limiting value or exceeds the upper limiting value at the beginning.

8. The method according to claim 1, wherein the control system comprises a motor-vehicle heating or air-conditioning system with a heat exchanger through which cooling water flows and which is operative for heating air flowing into the motor-vehicle and with cooling-water temperature measurement, comprising the steps of choosing the cooling-water temperature as the temperature parameter representative of the initial control system state and a limiting value is specified therefor, and upon the initial undershooting of the limiting value the control operation with the maximum counteractive action preceding the PI control is carried out.

* * * * *